US010656428B2

(12) United States Patent
Wei

(10) Patent No.: US 10,656,428 B2
(45) Date of Patent: May 19, 2020

(54) DUAL VIEW DISPLAY DEVICE

(71) Applicant: BOE Technology Group Co., Ltd., Beijing (CN)

(72) Inventor: Wei Wei, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/535,973

(22) PCT Filed: Jul. 28, 2016

(86) PCT No.: PCT/CN2016/092090
§ 371 (c)(1),
(2) Date: Jun. 14, 2017

(87) PCT Pub. No.: WO2017/156955
PCT Pub. Date: Sep. 21, 2017

(65) Prior Publication Data
US 2018/0120574 A1 May 3, 2018

(30) Foreign Application Priority Data

Mar. 18, 2016 (CN) .......................... 2016 1 0159145

(51) Int. Cl.
*G02B 27/12* (2006.01)
*G09G 3/00* (2006.01)
(52) U.S. Cl.
CPC .............. *G02B 27/126* (2013.01); *G09G 3/00* (2013.01)
(58) Field of Classification Search
CPC .............. G02B 27/126; G02B 27/2214; G02B 27/225; G02B 2027/0129; G09G 3/00
(Continued)

(56) References Cited

U.S. PATENT DOCUMENTS 7,580,186 B2    8/2009  Mather et al.
2005/0111100 A1*  5/2005  Mather ................. G02F 1/1323
                                                              359/464
(Continued)

FOREIGN PATENT DOCUMENTS

CN        1591088 A    3/2005
CN      101105579 A    1/2008
(Continued)

OTHER PUBLICATIONS

STIC Search report Aug. 8, 2018.*
(Continued)

*Primary Examiner* — Travis S Fissel
(74) *Attorney, Agent, or Firm* — Banner & Witcoff, Ltd.

(57) ABSTRACT

A dual view display device is disclosed. The dual view display device includes: a display panel including a plurality of first display regions and a plurality of second display regions, each of the first display regions and each of the second display regions are alternately arranged along an arbitrary direction of the display panel; a parallax barrier disposed on a light emitting side of the display panel and including a plurality of light-transmitting regions and a plurality of light-shielding regions, each of the light-transmitting regions and each of the light-shielding regions are alternately arranged along a direction identical with the arbitrary direction of the display panel; and a light refracting element, wherein the light refracting element is provided on a side of at least one of the light-transmitting regions which is away from the display panel, the light refracting element at least overlays the light-transmitting region.

18 Claims, 4 Drawing Sheets

(58) Field of Classification Search
USPC .............. 359/463, 464, 466, 467, 472, 630
See application file for complete search history.

(56) References Cited

U.S. PATENT DOCUMENTS

| | | | | |
|---|---|---|---|---|
| 2007/0058127 | A1* | 3/2007 | Mather | G02B 27/2214 349/159 |
| 2010/0182686 | A1* | 7/2010 | Fukushima | G02B 27/2214 359/463 |
| 2011/0182570 | A1 | 7/2011 | Yeh | |
| 2014/0111855 | A1 | 4/2014 | Johnson et al. | |
| 2014/0293172 | A1* | 10/2014 | Suzuki | G02B 27/2214 349/15 |
| 2015/0269893 | A1 | 9/2015 | Wu | |
| 2017/0108629 | A1 | 4/2017 | Lin | |

FOREIGN PATENT DOCUMENTS

| | | |
|---|---|---|
| CN | 101512415 A | 8/2009 |
| CN | 102067020 A | 5/2011 |
| CN | 103293689 A | 9/2013 |
| CN | 103609108 A | 2/2014 |
| CN | 104656307 A | 5/2015 |
| CN | 104698590 A | 6/2015 |
| CN | 104730604 A | 6/2015 |
| CN | 105654874 A | 6/2016 |
| CN | 205428452 U | 8/2016 |
| JP | 2008040027 A | 2/2008 |
| TW | 201126204 A | 8/2011 |

OTHER PUBLICATIONS

Dec. 21, 2017—(CN) First Office Action Appn 201610159145.5 with English Tran.
Dec. 22, 2016—(WO) International Search Report and Written Opinion Appn PCT/CN2016/092090 with English Tran.
Sep. 13, 2018—(CN) Second Office Action Appn 201610159145.5 with English Translation.
May 17, 2019—(CN) Third Office Action Appn 201610159145.5 with English Translation.

* cited by examiner

DUAL VIEW DISPLAY DEVICE

The application is a U.S. National Phase Entry of International Application No. PCT/CN2016/092090 filed on Jul. 28, 2016, designating the United States of America and claiming priority to Chinese Patent Application No. 201610159145.5, filed on Mar. 18, 2016. The present application claims priority to and the benefit of the above-identified applications and the above-identified applications are incorporated by reference herein in their entirety.

FIELD OF THE ART

Embodiments of the present disclosure relates to a dual view display device.

BACKGROUND

"Dual view display" refers to a display technology by which different images may be viewed from different locations of a display panel at the same moment.

As illustrated in FIG. 1, a dual view display device comprises a display panel 5 and a light splitter (that is, a dual view component) disposed on a light emitting side of the display panel 5. The display device 5 displays a two-dimensional (2D) image, and is divided into a plurality of alternately arranged first display regions 51 and second display regions 52. An example using a parallax barrier 91 as the dual view component is described herein. It is seen from FIG. 1 that the parallax barrier 91 consists of alternately arranged light-transmitting strips and light-shielding strips. Through the parallax barrier 91, a part of the display panel 5 (i.e., the first display regions 51) can be viewed only in a first viewing region 81 on the left side of the display panel 5, the other part of the display panel 5 (i.e., the second display region 52) can be viewed only in a second viewing region 82 on the right side of the display panel 5, while both the first display regions 51 and the second display regions 52 can be viewed in a cross-talking region 83.

With conventional dual view display devices, the larger the left and right viewing angles are, the lager the central cross-talking region is.

SUMMARY

An embodiment of the disclosure provides a dual view display device, which can reduce the central cross talking region, while ensuring better left and right viewing angles, so as to increases the display effect of the dual view display device.

An embodiment of the disclosure provides a dual view display device, comprising: a display panel comprising a plurality of first display regions and a plurality of second display regions, each of the first display regions and each of the second display regions being alternately arranged along an arbitrary direction of the display panel, the plurality of first display regions being configured for displaying a first image, and the plurality of second display regions being configured for displaying a second image; a parallax barrier disposed on a light emitting side of the display panel and comprising a plurality of light-transmitting regions and a plurality of light-shielding regions, each of the light-transmitting regions and each of the light-shielding regions being alternately arranged along the arbitrary direction of the display panel; and a light refracting element; wherein the light refracting element is provided on a side of at least one of light-transmitting regions which is away from the display panel, the light refracting element at least overlays the at least one of light-transmitting regions.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
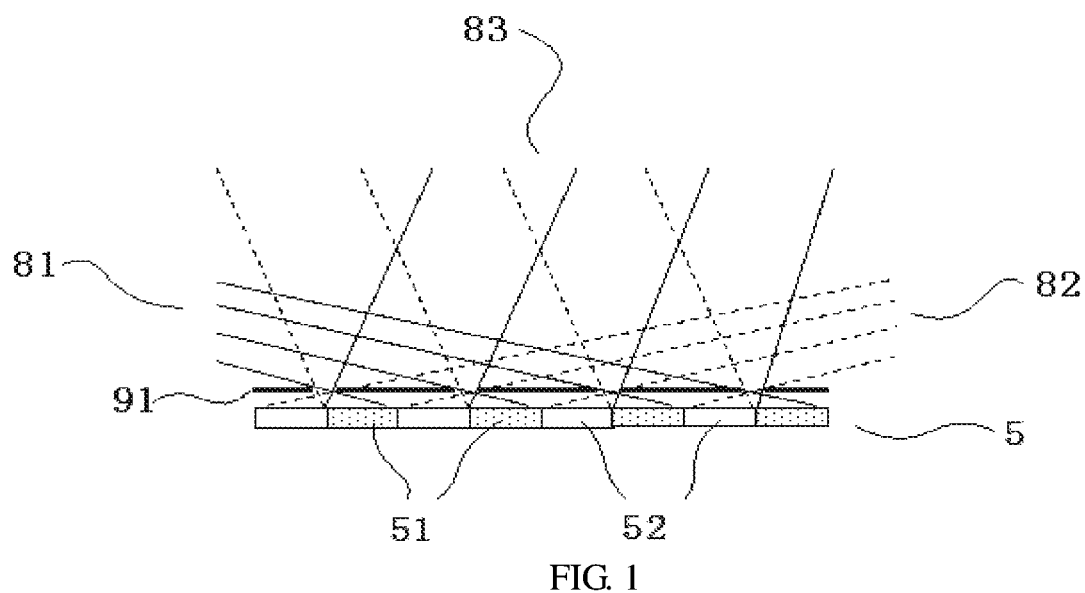
FIG. 1 schematically illustrates an exemplary dual view display device.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Similarly, the terms "a," "an," "the" are not intended to indicate the number, but represents at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At least one embodiment of the disclosure provides a dual view display device and a method for fabricating the same. The dual display device comprises: a display panel comprising a plurality of first display regions and a plurality of second display regions, each of the first display regions and each of the second display regions are alternately arranged along a single arbitrary direction of the display panel, the plurality of first display regions are configured for displaying a first image, and the plurality of second display regions are configured for displaying a second image; a parallax barrier disposed on a light emitting side of the display panel and comprising a plurality of light-transmitting regions and a plurality of light-shielding regions, each of the light-transmitting regions and each of the light-shielding regions are alternately arranged along the single arbitrary direction of the display panel; and a light refracting element; wherein the light refracting element is provided on a side of at least one of the light-transmitting regions which is away from the display panel, the light refracting element at least substantially overlays the at least one of light-transmitting regions. In the dual view display device according to the embodiment of the disclosure, by disposing the light refracting element in the light-transmitting region corresponding to the parallax barrier and making the light refracting element immediately next to the parallax barrier, it can significantly reduce angles of the central cross talking region, while ensuring better left and right viewing angles, in comparison with the conventional dual view display device. It thus increases the display effect of the dual view display device, and gives the viewer a better viewing experience.

In the following, the dual view display device and a method for manufacturing the same as provided by the embodiments of the disclosure will be described in detail with reference to the drawings, such that the technical solutions of the embodiments of the disclosure will be better understood.

First Embodiment

Figure 2:
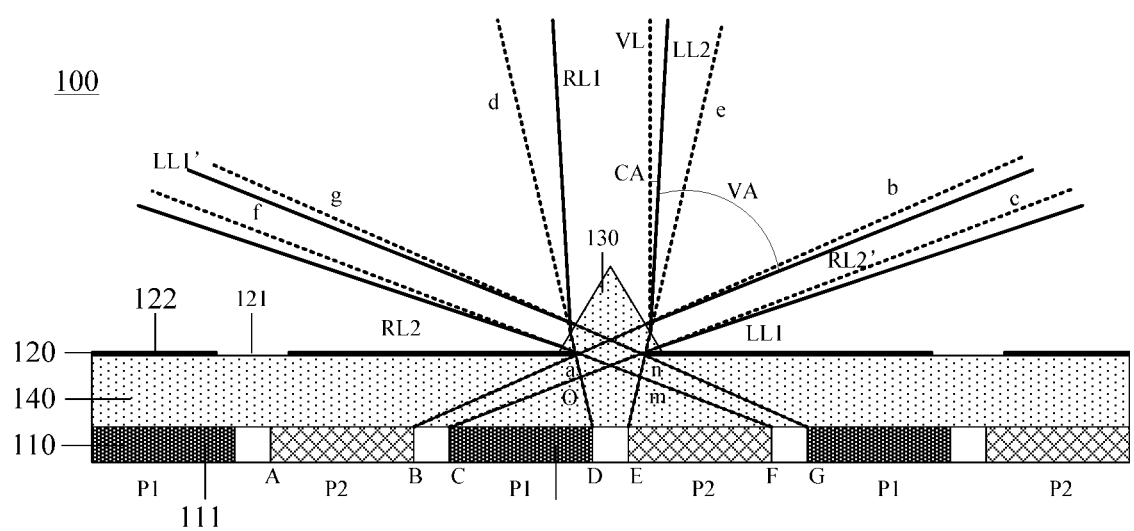
FIG. 2 schematically illustrates a cross section view of a dual view display device in accordance with at least one embodiment of the disclosure.

The embodiment provides a dual view display device 100 as illustrated in FIG. 2. The dual view display device 100 comprises: a display panel 110, comprising a plurality of pixels 111 arranged as an array, which comprises first display regions P1 for displaying a first image and second display regions P2 for displaying a second image alternately arranged along a column or row direction of the display panel; a parallax barrier 120 disposed on a light emitting side of the display panel 110 and comprising a plurality of light-transmitting regions 121 and a plurality of light-shielding regions 122 alternately arranged along the column or row direction; a light refracting element 130 disposed on a light emitting side of the parallax barrier 120, at least one of the plurality of light-transmitting regions 121 of the parallax barrier 120 corresponds to one light refracting element 130, the light refracting element 130 is in contact with the parallax barrier 120, and completely overlays the corresponding light-transmitting region 121. The light refracting element 130 extends along an extension direction of the light-transmitting region 121. For example, if the extension direction of the light-transmitting regions 121 of FIG. 2 is a direction perpendicular to the paper, then the extension direction of the light refracting element 130 is also the direction perpendicular to the paper. In other words, a length direction of the light refracting element 130 is the same as that of the light-transmitting regions 121.

As an example, each of the light refracting element protrudes towards the light emitting side, such that light passing through the light refracting element is refracted, thereby reducing the central cross-talking region.

As an example, the light refracting element 130 is one of a plurality of light refracting elements. The plurality of light refracting elements 130 are in one to one correspondence to the plurality of light-transmitting regions 121 of the parallax barrier 120.

As an example, only one or several, that is, a part of, of the plurality of light-transmitting regions 121 of the parallax barrier 120 has light refracting elements 130 in one to one correspondence thereto. That is, not all light-transmitting regions 121 have their corresponding light refracting elements 130, which are also within the scope of the protection of the embodiment of the present disclosure. Though the display effect of such a structure may be compromised, it can still reduce the central cross-talking region.

As an example, each of the light-transmitting regions 121 has a corresponding light refracting element 130. Alternatively, two or more light-transmitting regions 121 may correspond to one light refracting element 130. A person skilled in the art may make their choices as needed, which will not be limited in the embodiment of the disclosure.

For simplicity reasons, FIG. 2 illustrates only one light refracting element 130. However, each light-transmitting region 121 may be provided with one corresponding light refracting element 130, and the corresponding light refracting element 130 completely overlays the light-transmitting region 121. As an example, in regions other than the light-transmitting regions 121, no gap is present between the light refracting element 130 and the parallax barrier 120. If the light refracting element is bonded to the parallax barrier by an adhesive tape, a thickness of the adhesive tape may be ignored in the present disclosure. Therefore, it is considered as no gap exists between the two.

It is noted that the row direction in the present disclosure refers to a direction parallel to the horizontal plane, such as a width direction of a display panel, and the column direction refers to a vertical direction, such as a height direction of the display panel. As an example, FIG. 2 shows that the first display region displaying the first image and the second display region displaying the second image are pixel columns arranged along the row direction. Herein the first display region and the second display region may be pixel columns or sub-pixel columns, and a number of pixel columns or sub-pixel columns included in each of the first and second display regions may be equal to or greater than one. Alternatively, the first display region displaying the first image and the second display region displaying the second image may be pixel rows or sub-pixel rows. In this case, the first display region and the second display region are arranged alternately along the column direction, and a number of pixel rows or sub-pixel rows included in each of the first and second display regions may be equal to or greater than one, which will not be defined in the embodiment of the present disclosure. It can be understood that the first display region and the second display region may be alternately arranged along any direction of the display panel.

In case that the first display region displaying the first image and the second display region displaying the second image are arranged alternately along the row direction, for the purpose of splitting light, the light-transmitting regions and the light-shielding regions of the parallax barrier extend along the column direction and are arranged alternately along the row direction. In the case that the first display region displaying the first image and the second display region displaying the second image are arranged alternately along the column direction, the light-transmitting regions and the light-shielding regions of the parallax barrier extend along the row direction and are arranged alternately along the column direction. The arrangement direction of the first display region displaying the first image and the second display region displaying the second image is the same as that of the light-transmitting regions and the light-shielding regions of the parallax barrier, and the extension direction of the first display region and the second display region is parallel to that of the light-shielding regions and the light-transmitting regions.

For the purpose of illustration, FIG. 2 illustrates that both the first display region and the second display region include only one pixel column. It can be contemplated by a person skilled in the art that embodiments of the disclosure is not limitative to such a configuration; instead, it may choose a configuration as needed, which may include two or more pixel columns, or one, two or more pixel rows.

In the embodiment of the disclosure, each light refracting element may include two or more parts, and each light refracting element is formed by adjoining the two or more parts thereof side by side along an extension direction of the light refracting element. Alternatively, each light refracting element is formed by adjoining the two or more parts side by side along a direction perpendicular to the extension direction of the light refracting element, which will not be defined in the embodiment of the disclosure.

It is noted that the light emitting side is a displaying side.

Figure 3:
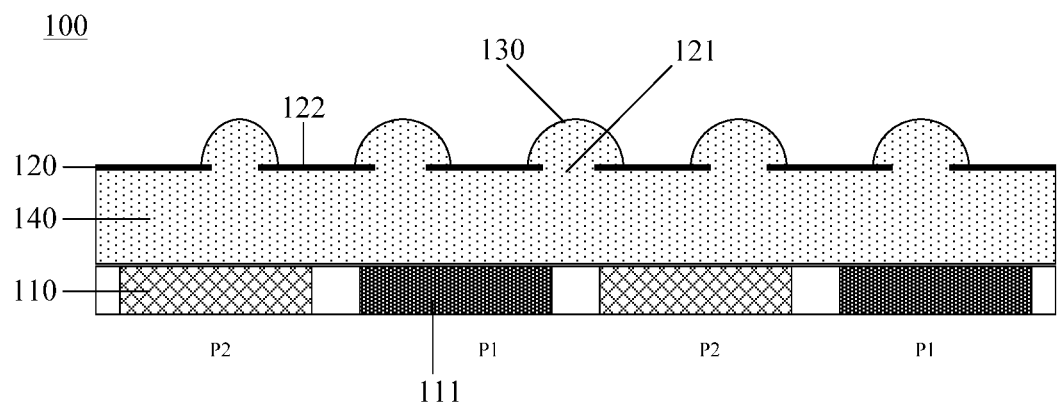
FIG. 3 schematically illustrates a cross section view of a dual view display device in accordance with at least one embodiment of the disclosure.

As an example, in the dual view display device 100 provided by an embodiment of the disclosure, the light refracting element 130 extends along the extension direction of the light-transmitting regions of the parallax barrier. In a cross section taken along a direction perpendicular to the extension direction of the light refracting element 130, all light refracting elements 130 have the same cross section shape. For example, the light refracting element 130 may be a columnar convex lens extending along the extension direction of the light-transmitting region. As illustrated in FIG. 3, the light refracting element protrudes towards the light emitting side of the dual view display device, and a convex surface of the columnar convex lens is a part of a cylindrical surface.

As an example, the plurality of light refracting elements may have space interval between one another, and connection portions may be disposed in the space. The connection portions may be homogeneous planar sheets in complete contact with the light-shielding regions. The connection portions may be integral with the light refracting elements, alternatively, the connection portions may be separated from the light refracting elements, but in contact with the light refracting elements and bonded to the light-shielding regions of the parallax barrier 120 together with several light refracting elements. For simplicity reasons, the connection portions between the plurality of light refracting elements are not shown.

It is also noted that in case that a width of the light-shielding regions of the parallax barrier is very small, it is likely that no space exists between the light refracting elements arranged corresponding to each light-shielding region, such a configuration is also within the scope of the embodiments of the disclosure.

As an example, the plurality of light refracting elements may have the same or different widths; the plurality of light refracting elements may have the same height. The plurality of light refracting elements may be equally spaced apart, or different space intervals may exist between neighboring light refracting elements. The embodiments will not make specific limitation here and a person skilled in the art may choose as needed.

Figure 4:
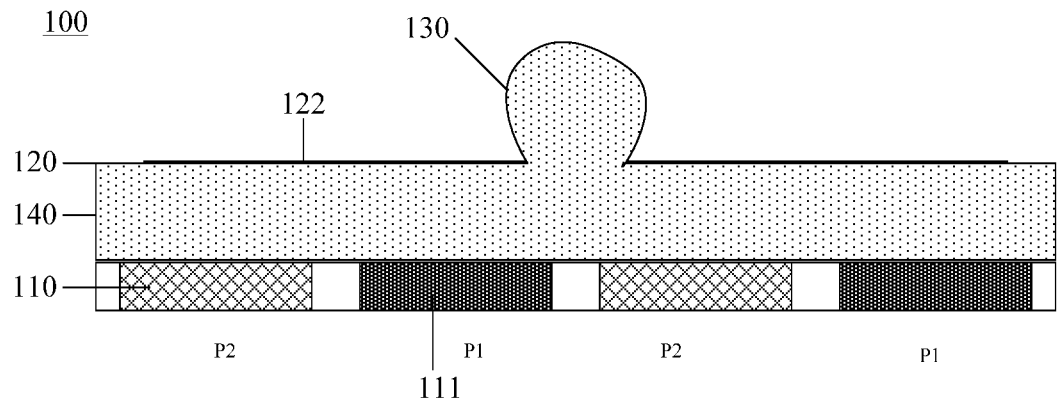
FIG. 4 schematically illustrates a cross section view of a dual view display device in accordance with at least one embodiment of the disclosure.

As an example, each of the plurality of light refracting elements may be a prism, a columnar convex lens as illustrated in FIG. 3 or a curved-surface lens, The surface of the light refracting element which is bonded to the parallax barrier is a plane, that is, the face of the light refracting element which faces the parallax barrier is a plane. The convex surface of the curved-surface lens is of an irregular shape. For example, the cross section perpendicular to the extension direction of the light refracting element has a shape of a part of an ellipse on the light emitting side. FIG. 4 illustrates an example of a curved-surface lens. As illustrated in FIG. 4, a protruding surface on the light emitting side of the curved-surface lens acting as the light refracting element is an irregular protruding surface.

As an example, each of the plurality of light refracting elements 130 forming a prism may be a triangular prism, a tetragonal prism, or a pentagonal prism. Herein the surface bonded to the parallax barrier, that is, the surface facing the parallax barrier, is one of prismatic surfaces of the prism, and the other prismatic surfaces are used to refract light.

Herein, the triangular prism is easy to fabricate, and requirements on its arrangement are low; and when viewed from a long or short distance, movement of a viewer is not limited or display effect is not affected much by the movement of the viewer.

As an example, the surface facing the parallax barrier of the light refracting element is in contact with the parallax barrier 120, and has a width larger than or equal to a width of the light-transmitting region 121 and smaller than a sum of the width of one light-transmitting region 121 and widths of two light-shielding regions 122. As an example, in the dual view display device 100 provided by an embodiment of the disclosure, a central line of the surface facing the parallax barrier 120 of the light refracting element may overlap with a central line of the corresponding light-transmitting region 121. The center of the triangular prism is arranged on the central line of the corresponding light-transmitting region. By this means, the dual view display device may achieve a better display effect, viewers respectively in the two display regions may enjoy substantively the same visual experience, thereby increasing the display effect of the dual view display device.

Figure 5:
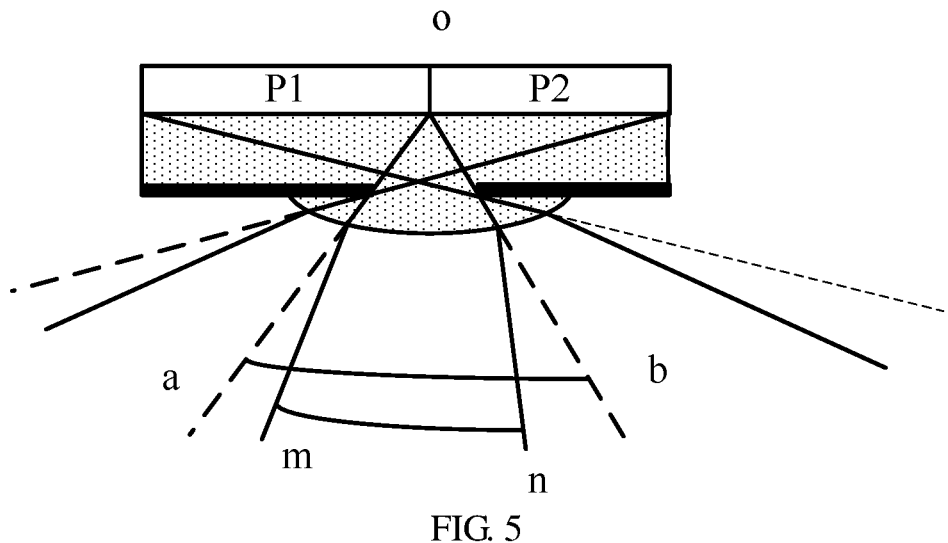
FIG. 5 is an optical path graph illustrating a dual view display device with enlarged viewing angles in accordance with an embodiment of the disclosure.

As an example illustrated in FIGS. 2 and 5, a surface of the triangular prism which faces the parallax barrier 120, that is, the bottom surface of the triangular prism, is in contact with the parallax barrier 120 and has a width S larger than or equal to the width of the light-transmitting region 121 and smaller than the sum of the width of one light-transmitting region 121 and widths of two light-shielding regions 122, each triangular prism overlays one light-transmitting region. Accordingly, a central line of the surface facing the parallax barrier 120, that is, a central line of the bottom surface of the triangular prism may overlap with a central line of the corresponding light-transmitting region 121. In this way, the dual view display device can achieve a better display effect, viewers respectively in the two display regions can enjoy substantively the same visual experience, thereby increasing the display effect of the dual view display device.

It is noted that the width of the light refracting element refers to a width along a direction perpendicular to the extension direction of the light-transmitting region, of the surface facing the parallax barrier. For example, for a triangular prism, the width refers to the width of the bottom surface.

Figure 6:
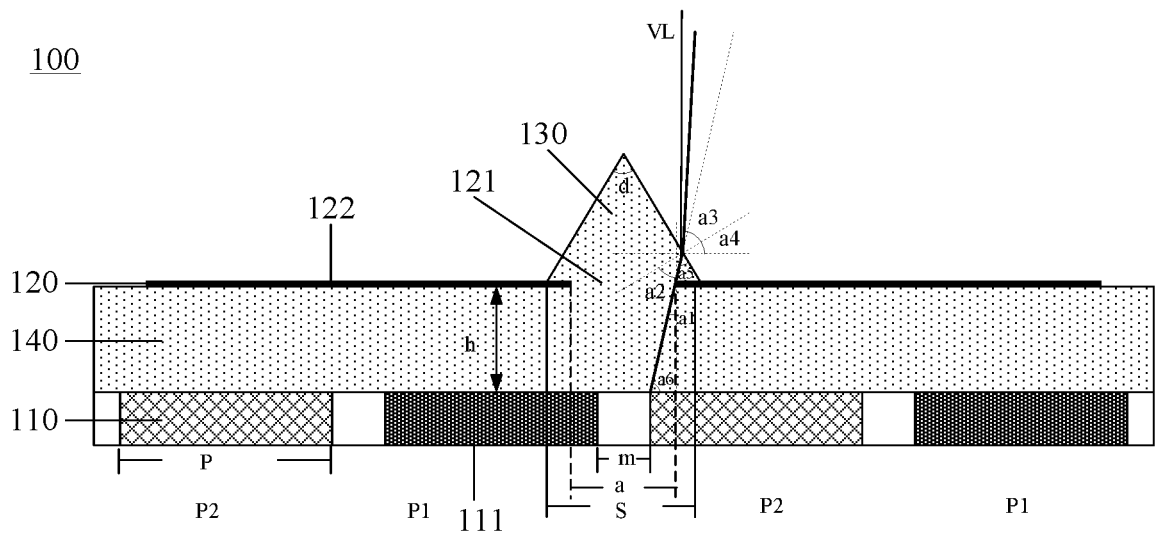
FIG. 6 schematically illustrates parameters of a dual view display device in accordance with an embodiment of the disclosure.

As an example, in the dual view display device 100 provided by the embodiment of the disclosure, the triangular prism is an isosceles triangular prism as illustrated in FIG. 6, two sides forming a vertex angle d are equal to each other. By using an isosceles triangular prism, the dual view display device has better symmetry, and the first display regions and second display regions located on the left and right sides of the display device are also symmetrical, viewers in both display regions can enjoy substantively the same visual experience, thereby increasing the display effect of the dual view display device. Moreover, isosceles triangular prisms are easy to fabricate, thereby reducing fabrication cost.

As an example, the vertex angle d in the embodiment of the disclosure is in a range of 70°-160°.

As an example, in the dual view display device 100 provided by an embodiment of the disclosure, a spacer 140 is disposed between the parallax barrier 120 and the display panel 110, which is illustrated in FIG. 6. A height h of the spacer 140 is substantially equal to a distance between the parallax barrier 120 and the display panel 110.

As an example, in the dual view display device 100 provided by an embodiment of the disclosure, the spacer 140 and the light refracting element 130 have the same refractive index.

As an example, in the dual view display device 100 provided by an embodiment of the disclosure, the spacer 140 and the light refracting element 130 are integral fabricated by using the same material, such as glass.

It is noted that the material for fabricating the spacer and the light refracting element includes but is not limited to glass; it may also be other light-transmitting material.

As an example, in the dual view display device 100 provided by an embodiment of the disclosure, the multiple light refracting elements 130 have the same size, i.e., have the same height and width. The height refers to a dimension measured along the extension direction of the light-transmitting regions, the width refers to a dimension measured along a direction perpendicular to the extension direction of the light-transmitting regions. It thus allows light passing through each light refracting element to have high homogeneity, which ensures a better display effect.

In the dual view display device 100 according to the embodiment of the disclosure, the light refracting element disposed is immediately next to and in contact with the parallax barrier corresponding to each light-transmitting region of the parallax barrier. In comparison with the conventional dual view display device, it can significantly reduce angles of the central cross-talking region while not changing the left and right viewing angles, thereby increasing the display effect of the dual view display device and the viewing experience of the viewer.

In the following it will describe how the dual view display device of the embodiment of the disclosure reduces the central cross-talking region with reference to FIG. 2.

In FIG. 2, AB, CD, EF respectively correspond to a second display region P2 displaying a second image, a first display region P1 displaying a first image and a second display region P2. Herein, dotted lines indicate that no light refracting element is provided, that is, the light directly output without being refracted, while solid lines indicate light refracted by the light refracting element. Solid lines RL1 and LL1 are respectively light output from edges C and D of the first display region P1, solid lines RL2 and LL2 are respectively light output from edges E and F of the second display region P2, solid line RL2' corresponds to the light output from a right edge B of the second display region P2, solid line LL1' corresponds to the light output from a left edge G of the first display region P1, dotted lines Bb, Cc, Dd, Ee, Ff and Gg are light output from edges B, C, D, E, F, G of the display region.

As shown in FIG. 2, when no refraction happen, doc is the viewing region of the first display region CD, fine is the viewing region of the second display region EF; and an overlapping region of the two, that is, the region between de, is the central cross-talking region. When refraction happens, the region between RL1 and LL1 is the viewing region of the first display region CD, the region between RL2 and LL2 is the viewing region of the second display region EF, and an overlapping region of the two, that is, the region between RL1 and LL2, is the central cross-talking region. It is obvious that the region between de is larger than the region between RL1 and LL2. It is thus seen that the central cross-talking region is significantly reduced by disposing the light refracting element corresponding to the light-transmitting region, and the left and right viewing angles are not significantly changed.

FIG. 2 is described with reference to the triangular prism acting as the light refracting element. For light refracting elements in other forms, by disposing the light refracting element corresponding to the light-transmitting region, it can also reduce the central cross-talking region. FIG. 5 shows an illustrative diagram. As illustrated in FIG. 5, before disposing the columnar convex lens, the central cross-talking region is aob; after disposing the columnar convex lens, the central cross-talking region is mon. It is obvious that central cross-talking region is significantly reduced after disposing the columnar convex lens, while the left and right viewing angles are not significantly changed.

Moreover, for the embodiment of the disclosure, by disposing the light refracting element immediately next to and in contact with the parallax barrier, the central cross-talking region may be further reduced, in comparison with the situation when a gap is present between the light refracting element and the parallax barrier in the light emitting direction. It also eliminates the no-light region when gap is present between the light refracting element and the parallax barrier in the light emitting direction.

Figure 8:
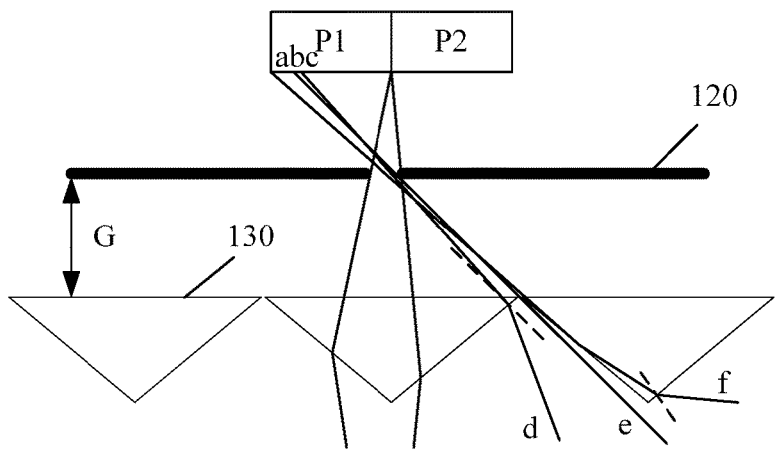
FIG. 8 is an optical path graph when a gap is present between a parallax barrier and a light refracting element.

Description is made in the following with reference to FIG. 8. FIG. 8 illustrates a situation when a gap is present between the light refracting element and the parallax barrier in the light emitting direction. As illustrated in FIG. 8, a gap G is present between the parallax barrier 120 and the light refracting element 130. In a region between e and f, light from the first display region is totally reflected by a side of a triangular prism on the right side, thus no light enters glasses of the viewer. Therefore a no-light region is present.

Furthermore, in comparison with the situation when the light refracting element is immediately next to and in contact with the parallax barrier, by translating the light, it is seen that the central cross-talking region is significantly lager when a gap is present between the light refracting element and the parallax barrier.

In the following, parameter settings of the light refracting element of the embodiment of the disclosure will be described with reference to FIGS. 2, 6, and 7, and the triangular prism acts as the light refracting element.

With reference to FIG. 2, CA is a cross-talking angle of the central cross-talking region, VA is the viewing angle of the dual view display device 100 and in the range of 35°-75°, such as 45°; VL is a line perpendicular to the parallax barrier. FIG. 6 illustrates the light output from the left edge E of the second display region EF of FIG. 2, and FIG. 7 is obtained by drawing the light output from the right edge B of the second display region AB of FIG. 2.

With reference to FIG. 6, the following equation is derived based on the principle of refraction, geometry and trigonometric function basics:

$$\tan(a_1) = \frac{\frac{a}{2} - \frac{m}{2}}{h} = \frac{(a-m)}{2h};$$

$$n\sin(a_2) = \sin(a_3);$$

$$a_4 = \frac{d}{2};$$

$$a_6 = a_4 + a_2 = 90° - a_1;$$

$$a_2 + a_5 = 90°;$$

If follows from the above that $$a_2 = 90° - \arctan\left(\frac{a-m}{2h}\right) - \frac{d}{2},$$

and the following equation is then derived:

$$a_3 = \arcsin\left[n \cdot \left(90° - \arctan\left(\frac{a-m}{2h}\right) - \frac{d}{2}\right)\right] \quad (1)$$

Figure 7:
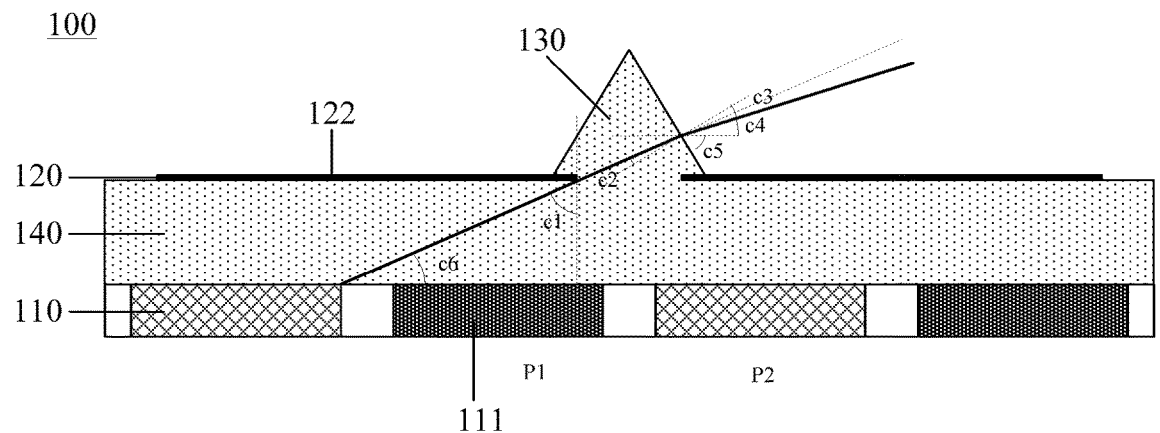
FIG. 7 schematically illustrates parameters of a dual view display device in accordance with an embodiment of the disclosure.

With reference to FIG. 7, the following equation is derived based on the principle of refraction, geometry and trigonometric function basics:

$$\tan(c_1) = \frac{\left[p + m - \left(\frac{a}{2} - \frac{m}{2}\right)\right]}{h} = \frac{2p + 3m - a}{2h};$$

$$c_6 = 90° - c_1;$$

$$c_5 = 90° - \frac{d}{2};$$

$$c_2 + c_5 + c_6 = 90°;$$

$$n\sin(c_2) = \sin(c_3);$$

If follows from the above that $$c_2 = \frac{d}{2} - 90° + \arctan\left(\frac{2p + 3m - a}{2h}\right)$$

$$c_3 = \arcsin(n\sin(c_2)) = \arcsin\left[n \cdot \sin\left[\frac{d}{2} - 90° + \arctan\left(\frac{2p + 3m - a}{2h}\right)\right]\right],$$

and the following equation is then derived:

$$c_4 = \frac{d}{2} - \arcsin\left[n \cdot \sin\left[\frac{d}{2} - 90° + \arctan\left(\frac{2p + 3m - a}{2h}\right)\right]\right] \quad (2)$$

It is seen from FIGS. 2, 6 and 7 that the cross-talking angle of the central cross-talking region is $CA=90°-a_3-a_4$, and the left or right viewing angle is $VA=a_3+a_4-c_4$. Substituting the above equations there-into, the following is obtained:

$$VA = \arcsin\left[n \cdot \left(90° - \arctan\left(\frac{a-m}{2h}\right) - \frac{d}{2}\right)\right] +$$
$$\arcsin\left[n \cdot \sin\left[\frac{d}{2} - 90° + \arctan\left(\frac{2p + 3m - a}{2h}\right)\right]\right]$$

$$CA = 90° - \arcsin\left[n \cdot \left(90° - \arctan\left(\frac{a-m}{2h}\right) - \frac{d}{2}\right)\right] - \frac{d}{2}$$

where a is a width of the light-transmitting region 121, p is a width of each pixel 111 of the display panel 110, m is a width of a black matrix of the display panel 110, d is a vertex angle of the triangular prism, h is a distance between the parallax barrier 120 and the display panel 110, n is a refractive index of the light refracting element 130, the vertex angle d of the triangular prism is an angle that allows cross-talking angle to be minimum without changing the range of the viewing angle.

As an example, the vertex angle according to the embodiment of the disclosure is in the range of 70°-160°.

For a dual view display device, it is expected that the viewing angle is maximum while the cross-talking angle is minimum. However, in the example of a triangular prism acting as the light refraction element, the expectation of obtaining the minimum cross-talking angle can be achieved. Therefore, for the triangular prism according to the embodiment of the disclosure, the value of the vertex angle d may be one allowing the cross-talking angle to be minimum without changing the range of the viewing angles. As a result, the dual view display device using a triangular prism with such parameters can achieve better dual view display effect.

For the other parameter of the triangular prism, that is, a width S of its base, the following has to be satisfied: the base width S is larger than the width of the light-transmitting region 121 and smaller than the sum of the width of one light-transmitting region 121 and widths of two light-shielding regions 122.

As an example, a landscape display panel is 7 inches in size and has 1280 by 800 pixels in resolution, for the dual with display device without the light refracting element, the left/right view angle is 50°, and the angle of the central cross-talking region is 20°. In contrast, for the dual view display device provided with triangular prism which acts as light refracting element as in the embodiment of the disclosure, the vertex angle of the triangular prism is 140° and the left/right viewing angle is 54.6°, the angle of the central cross-talking region is reduced to 8.3°. It is thus seen that the dual view display device according to the embodiment of the disclosure can increase the left/right viewing angle while reducing the angle of the central cross-talking region.

For light refracting elements other than the triangular prism, their parameters may be analyzed in a way similar to that of the above example of the triangular prism, which will not elaborated herein for simplicity reasons.

Second Embodiment

Figure 9:
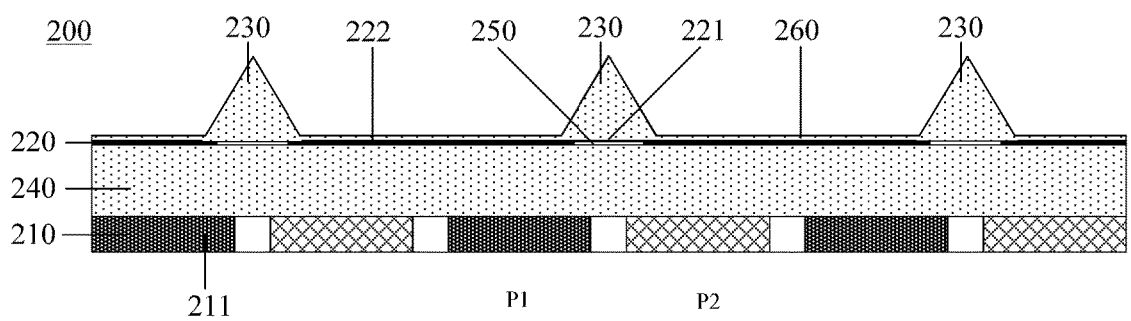
FIG. 9 schematically illustrates another cross section view of a dual view display device in accordance with an embodiment of the disclosure.

The embodiment further provides a dual view display device 200 as illustrated in FIG. 9. The second embodiment differs from the first embodiment in that a gap 250 is formed between the spacer 240 and the light refracting element 230 and in the light-transmitting region 221 along the light emitting direction, a thickness of the gap 250 is equal to that of the parallax barrier 220.

For example, the thickness of the gap 250 may also be smaller than that of the parallax barrier 220.

As an example, in the dual view display device 200 provided by the embodiment of the disclosure, a connecting portion 260 is disposed between any two adjacent light refractive elements 230. The connecting portion 260 is a homogeneous planar sheet and in complete contact with the light-shielding region 222.

As an example, the light refracting element 230 and the connection portion 260 are formed integrally. The connection portion 260 connects multiple light refracting elements 230 together to form a whole piece. Alternatively, the connection portion 260 may also be separated from but in contact with the light refracting elements 230 and bonded to the light-shielding regions 220 of the parallax barrier together with several light refracting elements 230. For example, when the multiple light refracting elements 230 are bonded to the parallax barrier 220, the light refracting elements 230 and light-transmitting regions 222 only need to be aligned once, which makes the fabrication of the dual view display device easier.

For other parts of the embodiment please refer to the relevant parts of the first embodiment, which will not be repeated here.

Third Embodiment

Figure 10:
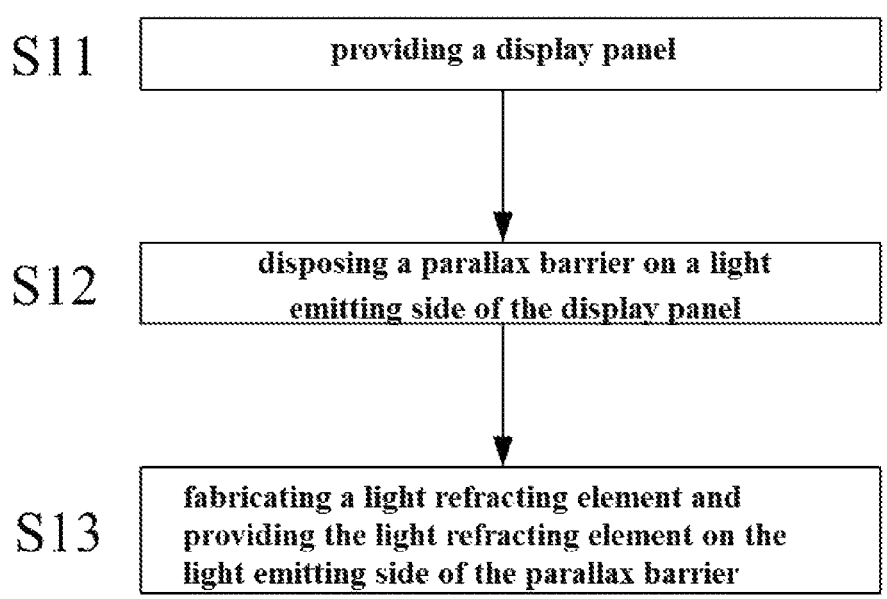
FIG. 10 schematically illustrates a flow chart of a method for fabricating a dual view display device in accordance with an embodiment of the disclosure.

The embodiment further provides a method for fabricating the dual view display device of the first or second embodiment. As illustrated in FIG. 10, the method comprises: providing a display panel, the display panel comprises a plurality of pixels arranged as an array, the plurality of pixels comprise first display regions displaying a first image and second display regions displaying a second image, the first and second display regions are arranged alternately along a row direction or a column direction; disposing a parallax barrier on a light emitting side of the display panel, the parallax barrier comprises a plurality of light-transmitting regions and a plurality of light-shielding regions alternately arranged along the row direction or the column direction; fabricating a light refracting element and providing the light refracting element on the light emitting side of the parallax barrier, wherein light refracting element is in contact with the parallax barrier and extends along an extension direction of the light-transmitting regions, at least one of the plurality of the light-transmitting regions of the parallax barrier corresponds to the light refracting element, and the light refracting element completely overlays the corresponding light-transmitting region.

As an example, the light refracting element is one of a plurality of light refracting elements and the plurality of light refracting elements are in one to one correspondence to the plurality of light-transmitting regions of the parallax barrier.

As an example, it may be one or several of, the plurality of light-transmitting regions of the parallax barrier, that is, only a part of the light-transmitting regions of the parallax barrier has light refracting elements in one to one correspondence to them. That is, not all light-transmitting regions have their corresponding light refracting elements, which is also within the scope of the protection of the disclosure. Though the display effect of such a structure may be compromised, it can still reduce the central cross-talking region.

As an example, each light-transmitting region may have a corresponding light refracting element. Alternatively, two or more light-transmitting regions may correspond to one light refracting element. A person skilled in the art may choose as needed, which will not be limited in the embodiment of the disclosure.

For simplicity reasons, structures and components identical to the first and second embodiment will not be repeated here. Instead, the fabrication method will be mostly described herein.

As an example, each light refracting element protrudes towards the light emitting side, such that light passing through the light refracting element is refracted, thereby reducing the central cross-talking region.

As an example, in the method for fabricating the dual view display device provided by the embodiment of the disclosure, the light refracting element may be a triangular prism. Fabricating the light refracting element comprises: determining a base width and a vertex angle of the triangular prism.

As an example, in the method for fabricating the dual view display device provided by the embodiment of the disclosure, determining the base width of the triangular prism comprises: determining the base width according to the width of the light-transmitting region such that the base width is larger than or equal to the width of the light-transmitting region and smaller than a sum of the width of one light-transmitting region and widths of two light-shielding regions. As an example, determining the vertex angle of the triangular prism comprises: determining the vertex angle of the triangular prism, based on a width of each pixel and a width of a black matrix of the display panel, the width of the light-transmitting region of the parallax barrier, a distance between the parallax barrier and the display panel, and in condition that a cross-talking angle of the central cross-talking region of the dual view display device is minimum within the range of the viewing angle.

As an example, in the method for fabricating the dual view display device provided by the embodiment of the disclosure, determining the vertex angle of the triangular prism, based on the width of each pixel and the width of the black matrix of the display panel, the width of the light-transmitting region of the parallax barrier, the distance between the parallax barrier and the display panel, and in condition that a cross-talking angle of the central cross-talking region of the dual view display device is minimum within the range of the viewing angle comprises:

Using the following equations, $$VA = \arcsin\left[n \cdot \left(90° - \arctan\left(\frac{a-m}{2h}\right) - \frac{d}{2}\right)\right] +$$
$$\arcsin\left[n \cdot \sin\left[\frac{d}{2} - 90° + \arctan\left(\frac{2p+3m-a}{2h}\right)\right]\right]$$

$$CA = 90° - \arcsin\left[n \cdot \left(90° - \arctan\left(\frac{a-m}{2h}\right) - \frac{d}{2}\right)\right] - \frac{d}{2}$$

to determine the vertex angle of the triangular prism such that the cross-talking angle of the central cross-talking region of the dual view display device is minimum within the range of the viewing angle. Herein VA is the viewing angle of the dual view display and in the range of 35°-75°, such as 45°; CA is the cross-talking angle of the central cross-talking region of the dual view display device, a is the width of the light-transmitting region, p is a width of each pixel of the display panel, m is a width of the black matrix of the display panel, d is the vertex angle of the triangular prism, h is a distance between the parallax barrier and the display panel, n is a refractive index of the light refracting element.

As an example, the vertex angle d of the triangular prism according to the embodiment of the disclosure is in a range of 70°-160°.

In some of embodiments, the light refracting element is bonded to the light emitting side of the parallax barrier.

In some of embodiments, the light refracting element and the spacer are an integral structure. The light refracting element and the spacer are made of a photosensitive glue bonded to the parallax barrier.

For example, in the method for fabricating the dual view display device provided by the embodiment of the disclosure, fabricating the light refracting element and providing the light refracting element on the light emitting side of the parallax barrier comprises: bonding the fabricated light refracting element to the light emitting side of the parallax barrier.

As an example, the plurality of light refracting elements may be fabricated separately and then bonded onto the light emitting side of the parallax barrier, respectively corresponding to each light-transmitting region. When being bonded, a central line of each of the light refracting elements may overlap with a central line of the light-transmitting region.

Alternatively, the plurality of light refracting elements may be integrally formed with connection portions therebetween. By this means, when being bonded, it only needs to align the central line of a light refracting element in the central position to the central line of a light-transmitting region, such that light refracting elements and light-transmitting regions in other positions are automatically aligned. It thereby makes the bonding easier and can reduce errors, making the fabrication easier.

For the light refracting element and parallax barrier connected via bonding, in the light-transmitting region, there may be a gap between the parallax barrier and the spacer, and air may be present in the gap. If the bonding is performed in vacuum, the gap will be a vacuum gap. However, as the gap is relatively smaller, it will not compromise the effect of reducing the central cross-talking region by the light refracting element.

As an example, in the method for fabricating the dual view display device provided by the embodiment of the disclosure, fabricating the light refracting element and providing the light refracting element on the light emitting side of the parallax barrier comprises: applying a photosensitive glue to the parallax barrier; molding the photosensitive glue by using a mold and light-curing the photosensitive glue; removing the mold.

In the dual view display device fabricated this way, when the photosensitive glue is applied to the parallax barrier, the glue will also be applied to the light-transmitting regions. As a result, no gap is present between the parallax barrier and the spacer in the light-transmitting regions.

In the dual view display device and the method for fabricating the same according to the embodiments of the disclosure, at least one of the light-transmitting regions of the parallax barrier has a corresponding light refracting element, the light refracting element is in contact with the parallax barrier, completely overlays the corresponding light-transmitting region, and extends along the extension direction of the light-transmitting region. By providing the light refracting element corresponding to the light-transmitting regions of the parallax barrier and providing it immediately next to the parallax barrier, in comparison with the conventional dual view display device, it significantly reduces the angle of the central cross-talking region while not changing the left and right viewing angles, thereby increasing the display effect of the dual view display device and the viewing experience of the viewer.

What is described above is related to the illustrative embodiments of the disclosure only and not limitative to the scope of the disclosure; the scopes of the disclosure are defined by the accompanying claims.

The present application claims priority from Chinese Application No. 201610159145.5, filed on Mar. 18, 2016, the disclosure of which is incorporated herein by reference in its entirety.

What is claimed is:

1. A dual view display device, comprising:
a display panel comprising a plurality of first display regions and a plurality of second display regions, each of the first display regions and each of the second display regions being alternately arranged along an arbitrary direction of the display panel, the plurality of first display regions being configured for displaying a first image, and the plurality of second display regions being configured for displaying a second image;
a parallax barrier disposed on a light emitting side of the display panel and comprising a plurality of light-transmitting regions and a plurality of light-shielding regions, each of the light-transmitting regions and each of the light-shielding regions being alternately arranged along the arbitrary direction of the display panel; and
a light refracting element,
wherein the light refracting element is provided on a side of at least one of light-transmitting regions which is away from the display panel, the light refracting element at least overlays the at least one of light-transmitting regions,
wherein the light refracting element comprises a triangular prism, and the triangular prism is tapered, and a width of the triangular prism in a direction parallel to the display panel gradually reduces along a direction from the display panel to the parallax barrier, and
wherein a vertex angle d of the triangular prism satisfies the following equations:

$$VA = \arcsin\left[n \cdot \left(90° - \arctan\left(\frac{a-m}{2h}\right) - \frac{d}{2}\right)\right] +$$
$$\arcsin\left[n \cdot \sin\left[\frac{d}{2} - 90° + \arctan\left(\frac{2p + 3m - a}{2h}\right)\right]\right]$$
$$CA = 90° - \arcsin\left[n \cdot \left(90° - \arctan\left(\frac{a-m}{2h}\right) - \frac{d}{2}\right)\right] - \frac{d}{2}$$

wherein VA is a viewing angle of the dual view display device, CA is a cross-talking angle of a central cross-talking region of the dual view display device, a is the width of the light-transmitting region, p is a width of each pixel of the display panel, m is a width of a black matrix of the display panel, d is the vertex angle of the triangular prism, h is a distance between the parallax barrier and the display panel, n is a refractive index of the light refracting element, and the vertex angle of the triangular prism is an angle that allows the cross-talking angle to be minimum.

2. The dual view display device of claim 1, wherein the light refracting element is one of a plurality of light refracting elements and the plurality of light refracting elements are in one to one correspondence to the plurality of light-transmitting regions of the parallax barrier.

3. The dual view display device of claim 2, wherein a surface facing the parallax barrier of each of the light refracting elements is planar and in contact with the parallax barrier, and a width of the surface facing the parallax barrier of each of the light refracting elements is larger than or equal to a width of the light-transmitting region and smaller than a sum of the width of one light-transmitting region and widths of two light-shielding regions.

4. The dual view display device of claim 1, wherein a central line of the surface facing the parallax barrier of each of the light refracting elements overlaps with a central line of the corresponding light-transmitting region.

5. The dual view display device of claim 1, wherein a base of the triangular prism faces and is in contact with the parallax barrier, and a width of the base of the triangular prism is larger than or equal to a width of the light-transmitting region and smaller than a sum of the width of one light-transmitting region and widths of two light-shielding regions.

6. The dual view display device of claim 5, wherein a central line of the base of the triangular prism overlaps with a central line of the corresponding light-transmitting region.

7. The dual view display device of claim 6, wherein the triangular prism is an isosceles triangular prism.

8. The dual view display device of claim 1, wherein the range of the viewing angle is 35° to 75°.

9. The dual view display device of claim 1, wherein a spacer is disposed between the parallax barrier and the display panel.

10. The dual view display device of claim 9, wherein the spacer and the light refracting element have the same refractive index.

11. The dual view display device of claim 10, wherein the spacer and the light refracting element are integrally formed with a same material.

12. The dual view display device of claim 11, wherein the spacer and the light refracting element are made of glass.

13. The dual view display device of claim 10, wherein the spacer and the light refracting element have a gap therebetween in the light-transmitting region along the light emitting direction, a thickness of the gap is equal to that of the parallax barrier.

14. The dual view display device of claim 1, wherein the light refracting element is bonded onto a light emitting side of the parallax barrier.

15. The dual view display device of claim 9, wherein the light refracting element and the spacer forms an integral structure, and the light refracting element and the spacer are made of a photosensitive glue bonded to the parallax barrier.

16. The dual view display device of claim 2, wherein connection portions are provided between any two adjacent light refractive elements of the plurality of light refractive elements, the connection portions each is a homogeneous planar sheet and in complete contact with at least one of the light-shielding regions.

17. The dual view display device of claim 2, wherein the plurality of light refractive elements have the same height and width.

18. A dual view display device, comprising:
a display panel comprising a plurality of first display regions and a plurality of second display regions, each of the first display regions and each of the second display regions being alternately arranged along an arbitrary direction of the display panel, the plurality of first display regions being configured for displaying a first image, and the plurality of second display regions being configured for displaying a second image;
a parallax barrier disposed on a light emitting side of the display panel and comprising a plurality of light-transmitting regions and a plurality of light-shielding regions, each of the light-transmitting regions and each of the light-shielding regions being alternately arranged along the arbitrary direction of the display panel; and
a light refracting element,
wherein the light refracting element is provided on a side of at least one of light-transmitting regions which is away from the display panel, the light refracting element at least overlays the at least one of light-transmitting regions,
wherein the light refracting element comprises a triangular prism, and
wherein a vertex angle d of the triangular prism satisfies the following equations:

$$VA = \arcsin\left[n \cdot \left(90° - \arctan\left(\frac{a-m}{2h}\right) - \frac{d}{2}\right)\right] +$$
$$\arcsin\left[n \cdot \sin\left[\frac{d}{2} - 90° + \arctan\left(\frac{2p + 3m - a}{2h}\right)\right]\right]$$
$$CA = 90° - \arcsin\left[n \cdot \left(90° - \arctan\left(\frac{a-m}{2h}\right) - \frac{d}{2}\right)\right] - \frac{d}{2}$$

wherein VA is a viewing angle of the dual view display device, CA is a cross-talking angle of a central cross-talking region of the dual view display device, a is a width of the light-transmitting region, p is a width of each pixel of the display panel, m is a width of a black matrix of the display panel, d is the vertex angle of the triangular prism, h is a distance between the parallax barrier and the display panel, n is a refractive index of the light refracting element, and the vertex angle of the triangular prism is an angle that allows the cross-talking angle to be minimum.

* * * * *